(12) United States Patent
Plas et al.

(10) Patent No.: US 6,293,077 B1
(45) Date of Patent: Sep. 25, 2001

(54) DECK ATTACHMENT AND LIFT SYSTEM (75) Inventors: Matthew J. Plas, Elyria; Marty Pierce, North Royalton, both of OH (US)

(73) Assignee: MTD Products INC, Cleveland, OH (US)

( * ) Notice: Subject to any disclaimer, the term of this patent is extended or adjusted under 35 U.S.C. 154(b) by 0 days.

(21) Appl. No.: 09/580,188

(22) Filed: May 26, 2000

Related U.S. Application Data
(60) Provisional application No. 60/201,096, filed on May 2, 2000.

(51) Int. Cl.$^7$ .................................................. A01D 34/03
(52) U.S. Cl. ............................................................. 56/17.1
(58) Field of Search ................................. 56/15.6, 15.7, 56/15.8, 15.2, 17.1, 15.1, 17.2, DIG. 14, DIG. 22; 180/19.1, 19.3

(56) References Cited

U.S. PATENT DOCUMENTS

| | | | |
|---|---|---|---|
| 4,664,405 | 5/1987 | Bedis | 280/490 |
| 4,737,067 | 4/1988 | Samejima et al. | 414/686 |
| 4,817,728 | 4/1989 | Schmid et al. | 172/273 |
| 4,826,389 | 5/1989 | Meyer et al. | 414/686 |
| 5,025,617 | 6/1991 | Kuhn et al. | 56/15.6 |
| 5,483,789 | 1/1996 | Gummerson | 56/14.7 |
| 5,528,886 | 6/1996 | Esau | 280/455.1 |
| 5,784,870 | 7/1998 | Seegert et al. | 56/320.1 |
| 5,813,203 | 9/1998 | Peter | 56/17.2 |
| 5,816,035 | 10/1998 | Schick | 56/15.2 |
| 5,956,932 | 9/1999 | Schmidt | 56/15.6 |
| 5,970,690 | 10/1999 | Toman | 56/7 |

*Primary Examiner*—Robert E. Pezzuto
(74) *Attorney, Agent, or Firm*—Emerson & Skeriotts; Roger D. Emerson; Timothy D. Bennett

(57) ABSTRACT

A riding mower has a deck attachment mechanism for use in attaching a mower deck to the mower frame and a deck lift mechanism for use in lifting the mower deck. The deck attachment mechanism forms a four-sided parallelogram and includes a first side formed of a first link and a second side formed of second and third links. The second and third links together form a split link and the third link may be pivoted about the second link into first and second positions. The first link has an effective length L1 and the split link has an effective length L2 when the third link is positioned into the first position and an effective length L1 when the third link is positioned into the second position. The effective length L2 is less than the effective length L1. The deck attachment mechanism also includes a lock bracket and a lock lever to lock the third link into the second position. The deck lift mechanism includes a lift cylinder mounted to the frame and connected to the third link. The lift cylinder is operated to position the third link into the second position as the mower deck is lifted.

15 Claims, 6 Drawing Sheets

FIG-7

DECK ATTACHMENT AND LIFT SYSTEM

This Utility Patent Application claims priority from Provisional Patent Application Serial No. 60/201,096 filed May 2, 2000.

BACKGROUND OF THE INVENTION

1. Field of Invention

This invention pertains to the art of methods and apparatuses for attaching and lifting devices and more specifically to methods and apparatuses for attaching and lifting a mower deck.

2. Description of the Related Art

It is known in the art to provide mower deck attachment and lifting systems whereby a mower deck can be attached to a lawn tractor and then lifted to the appropriate height for cutting grass or the like. Typically, the deck attachment mechanism forms a parallelogram so that the front and back of the mower deck can be lifted evenly. Such known mower deck attachment and lifting systems are adequate for their intended purpose. However, such known deck attachment and lifting systems have a problem.

The problem is related to the operator difficulty in attaching the mower deck to the tractor. Typically, the operator must carefully position the deck with respect to the attachment mechanism and then insert a number of quick connect pins or the like to hold the deck to the attachment mechanism. What is needed is an easy method to attach the deck to the tractor.

The present invention provides methods and apparatuses for simplifying the attachment of a deck to a tractor while still maintaining the attachment mechanism in the desired parallelogram. The difficulties inherit in the art are therefore overcome in a way that is simple and efficient, while providing better and more advantageous results.

SUMMARY OF THE INVENTION

According to one aspect of the present invention, a riding mower has a deck attachment mechanism for use in attaching a mower deck to the mower frame and a deck lift mechanism for use in lifting the deck attachment mechanism and the mower deck. The deck attachment mechanism forms a four-sided parallelogram and includes a first side formed of a first link. The first link has a first end connected to the frame and a second end adapted to be connected to the mower deck. The first link has an effective length L1 that means the distance between where the first link connects to the frame and where the first link connects to the mower deck. The deck attachment mechanism also includes a second side formed of second and third links that together form a split linkage. The split linkage has a first end connected to the frame and a second end adapted to be connected to the mower deck. The third link may be pivoted about the second link into first and second positions. The split linkage has an effective length L2 when the third link is positioned into the first position and an effective length L1 when the third link is positioned into the second position. The effective length L2 is less than the effective length L1. The deck attachment mechanism also includes a lock bracket and a lock lever to lock the third link into the second position. The deck lift mechanism includes a lift cylinder mounted to the frame and connected to the third link. The lift cylinder is operated to position the third link into the second position as the mower deck is lifted.

According to another aspect of the present invention, a method of attaching the mower deck to the riding mower is provided. First, the mower deck is placed under the riding mower. Next the first link is loosely attached to one end of the mower deck and the split link is loosely attached to the other end of the mower deck. The lift cylinder is then operated to lift the deck attachment mechanism and the mower deck. As the lift cylinder continues to lift, the third link is positioned into the second position thereby providing the split link with an effective length L1.

One advantage of this invention is that an operator can easily attach a mower deck to a riding mower without having to insert connection pins or the like.

Another advantage of this invention is that a parallelogram is used to provide even height adjustment for the mower deck but one side of the parallelogram can be shortened to simplify mower deck attachment.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENTS

Figure 1:
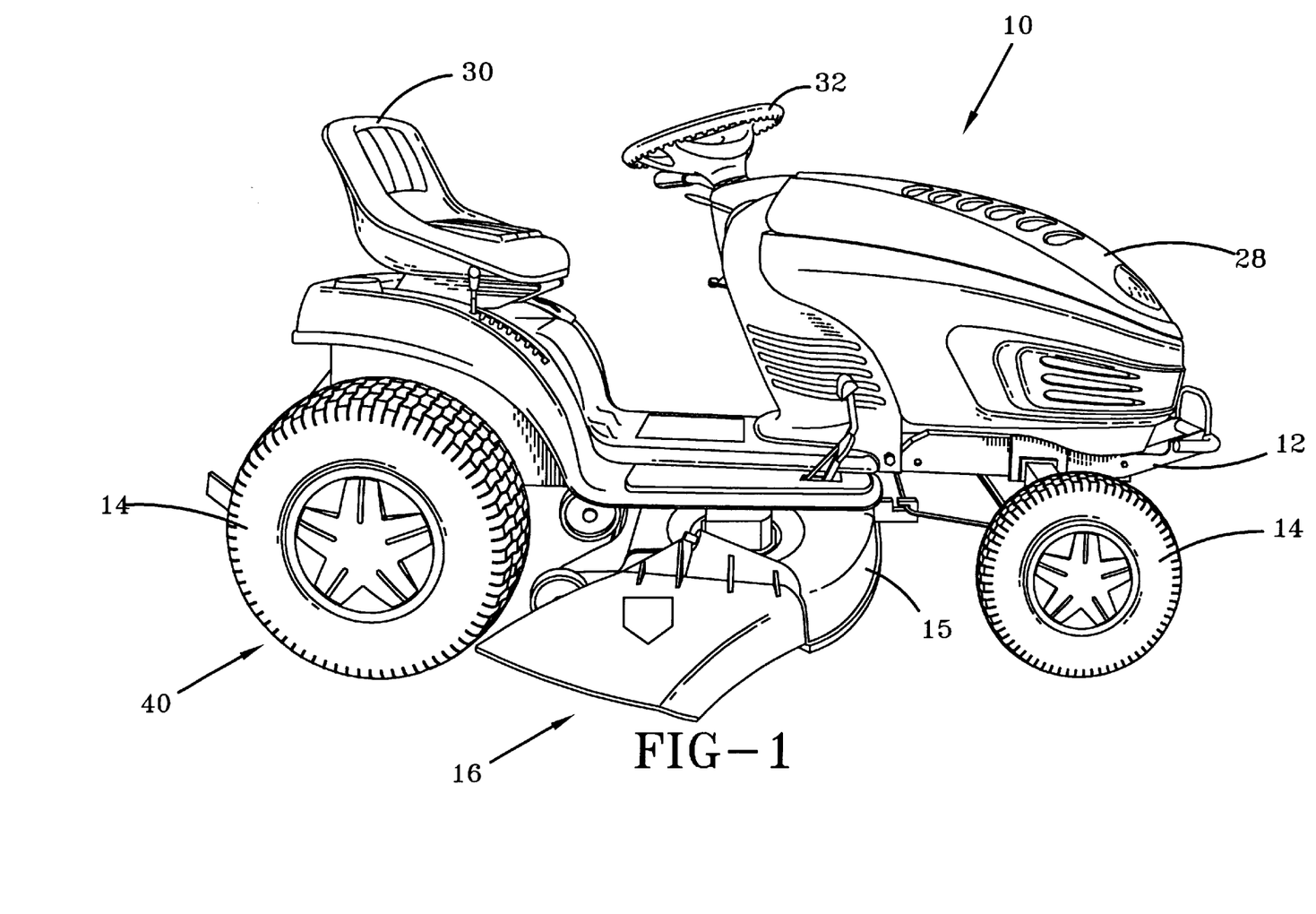
FIG. 1 is a side perspective view of a riding mower equipped with the deck attachment and lift system of this invention.

Referring now to the drawings wherein the showings are for purposes of illustrating a preferred embodiment of the invention only and not for purposes of limiting the same, FIG. 1 shows a tractor 10 equipped with the deck attachment and lift system 40 of this invention. Throughout this disclosure the inventive attachment and lift system is described with reference to a mower deck attached to a riding lawn tractor but the invention is also applicable to other mowers, other vehicles, other types of decks and other applications as well.

With reference now to FIGS. 1–2, and 4–5, the tractor 10 has a frame 12 with first and second sides 11, 13 and a plurality of ground engaging wheels 14 operatively connected to the frame 12. A mower deck 15 has at least a first cutting blade 16 (shown schematically in FIG. 2) for use in cutting associated vegetation (not shown) such as lawn grass. The mower deck 15 has first and second attachment means 18, 20 for use in attaching the deck 15 to the tractor 10. The preferred first attachment means 18 includes an attachment bracket 22 that is fixedly connected to the front of the deck 15. The attachment bracket 22 has at least one (preferably two) receiving slot 24 to be used as discussed below. The second attachment means 20 preferably includes at least one (preferably two) lift link 26 that is fixedly connected to the back of the deck 15 and that extends therefrom. It should be noted that any first and second attachment means chosen with sound engineering judgement may be used equally well with this invention. The tractor 10 also includes an engine 28 mounted to the frame 12 and used to rotate the cutting blade 16 and to provide power to rotate the wheels 14. An operator seat 30 is also mounted to the frame 12 and a steering mechanism 32 (steering wheel shown) is used to steer at least a pair of the wheels 14.

With reference now to FIGS. 2–5, the deck attachment and lift system 40 includes a deck attachment mechanism 50 and a lift mechanism 100. The deck attachment mechanism 50 forms a four-sided parallelogram (visualized by connecting the four corners A, B, C and D shown in FIG. 2) so that the deck 15 may be height adjusted evenly. In the preferred embodiment, the deck attachment mechanism 50 forms a four-sided parallelogram on the first and second sides 11, 13 of the frame 12. A first side of the parallelogram (defined by a line, not shown, that connects corner C to corner D) is formed of a first link 52 having first and second ends 54, 56. The first end 54 is adapted to be connected to the frame 12 by any means chosen with sound engineering judgement. The second end 56 is adapted to be connected to the first attachment means 18 of the deck 15. In the preferred embodiment shown, the second end 56 of the first link 52 is received within the slots 24. It should be noted that the first link 52 has an effective length of L1 (shown in FIGS. 2–3). By effective length, it is meant the distance between where the first link 52 connects to the frame 12 and where the first link 52 connects to the deck 15.

Figure 2:
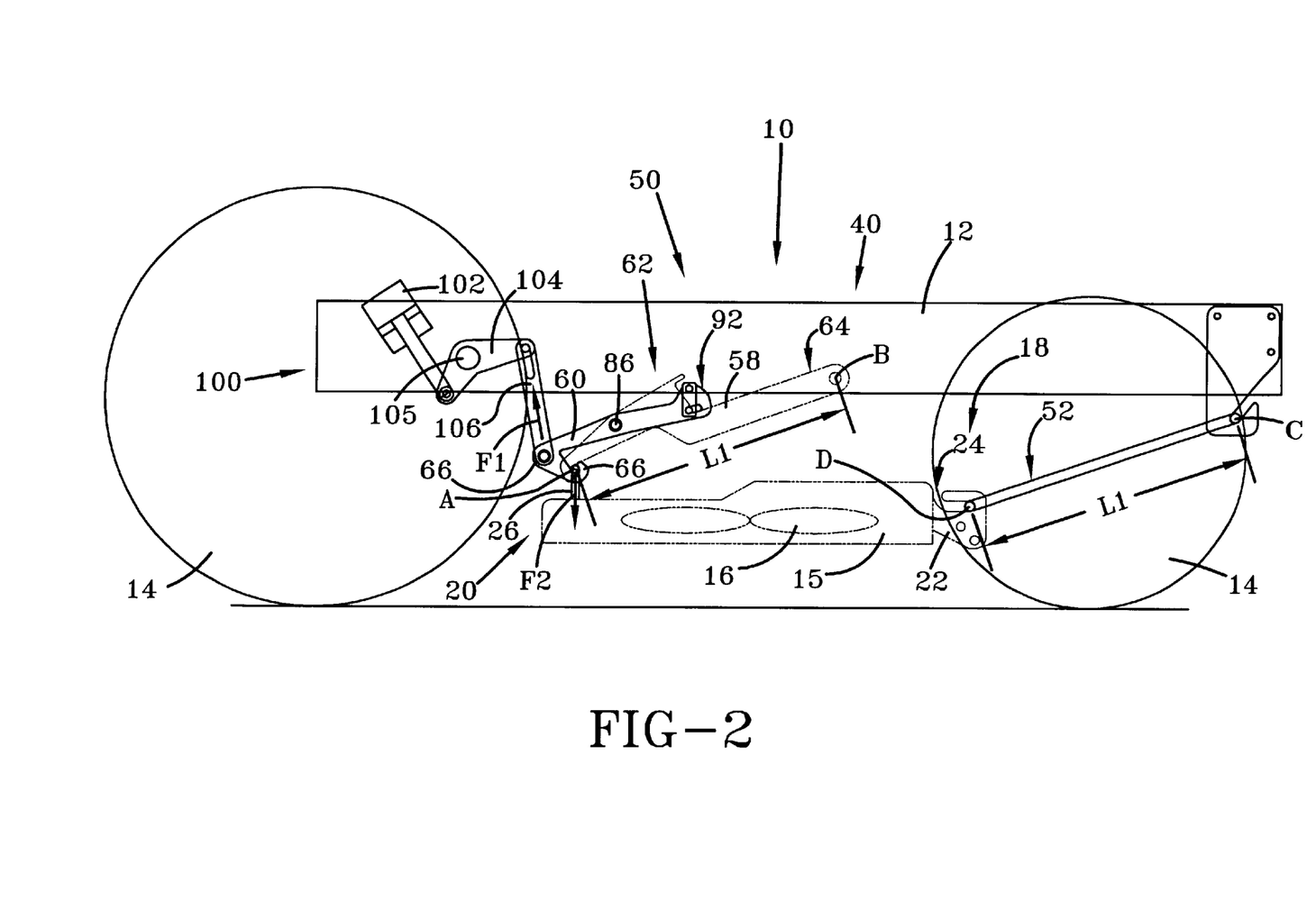
FIG. 2 is schematic representation showing the third link in a second position with respect to the second link thereby providing the split link with an effective length L1 equal to the effective length L1 of the first link.

With continuing reference to FIGS. 2–5, a second side of the parallelogram (defined by a line, not shown, that connects corner A to corner B in FIG. 2) is formed of second and third links 58, 60 that together form a split link 62. The split link 62 has a first end 64 adapted to be connected to the frame 12 and a second end 66 adapted to be connected to the second attachment means 20 of the deck 15. Preferably, the first end 64 is pivotably attached to the frame 12 (at corner B) as shown. The second end 66 connects to the lift link 26 as will be discussed further below. Because the third link 60 is pivotable about the second link 58 (as will also be described below) the split link 62 provides two effective lengths. By effective length, it is meant that the distance between where the split link 62 connects to the frame 12 and where the split link 62 connects to the deck 15. When the third link 60 is in a first position with respect to the second link 58 (shown in FIG. 3) the split link 62 has an effective length L2 that is less than the previously described effective length L1. This effective length L2 makes it easy to attach the deck 15 to the split link 62. When the third link 60 is in a second position with respect to the second link 58 (shown in FIG. 2) the split link 62 has an effective length L1—equal to the effective length L1 of the first link 52. When the first link 52 and split link 62 have the same effective length L1, the deck attachment mechanism 50 forms a parallelogram so that subsequent height adjustments of the deck 15 will occur evenly.

Referring now to FIGS. 2–7, the second link 58 has a first end 68 that preferably defines the previously described first end 64 of the split link 62. The second link 58 also has a second end 70 that is adapted to contact the deck 15 through the second attachment means 20. Preferably, the second end 70 defines a receiving area 72 that contacts the lift link 26 as will be discussed further below. The second link 58 includes first and second slots 74, 76 and a cam surface 77 between the slots 74, 76. Preferably the first and second slots 74, 76 are positioned between the first and second ends 68, 70 of the second link 58. The third link 60 has a first end 78 that includes an aperture 80 and a second end 82 that is adapted to be connected to the second attachment means 20 of the deck 15. Preferably the second end 82 includes a receiving area 84 that supports the lift link 26. The third link 60 is pivotably connected to the second link 58 through a pivot rod 86 that is received within holes 88, 90 in the second and third links 58, 60 respectively. The hole 90 in the third link 60 (and thus the pivot point) is preferably positioned between the first and second ends 78, 82 as shown. When the third link 60 is in the first position (shown in FIG. 3) the second end 82 of the third link 60 defines the second end 66 of the split link 62 as the receiving area 84 receives the lift link 26. When the third link 60 is then moved into the second position (shown in FIG. 2) the second end 82 of the third link 60 and the second end 70 of the second link 58 together define the second end 66 of the split link 62. In particular, both the receiving area 84 and the receiving area 72 receive the lift link 26. It should be noted that the receiving area 84 of the third link 60 faces generally upward and the receiving area 72 of the second link 58 faces generally downward. Thus, the lift link 26 is held firmly in place between the receiving areas 84, 72 when the third link 60 is moved into the second position (shown in FIG. 2).

Figure 3:
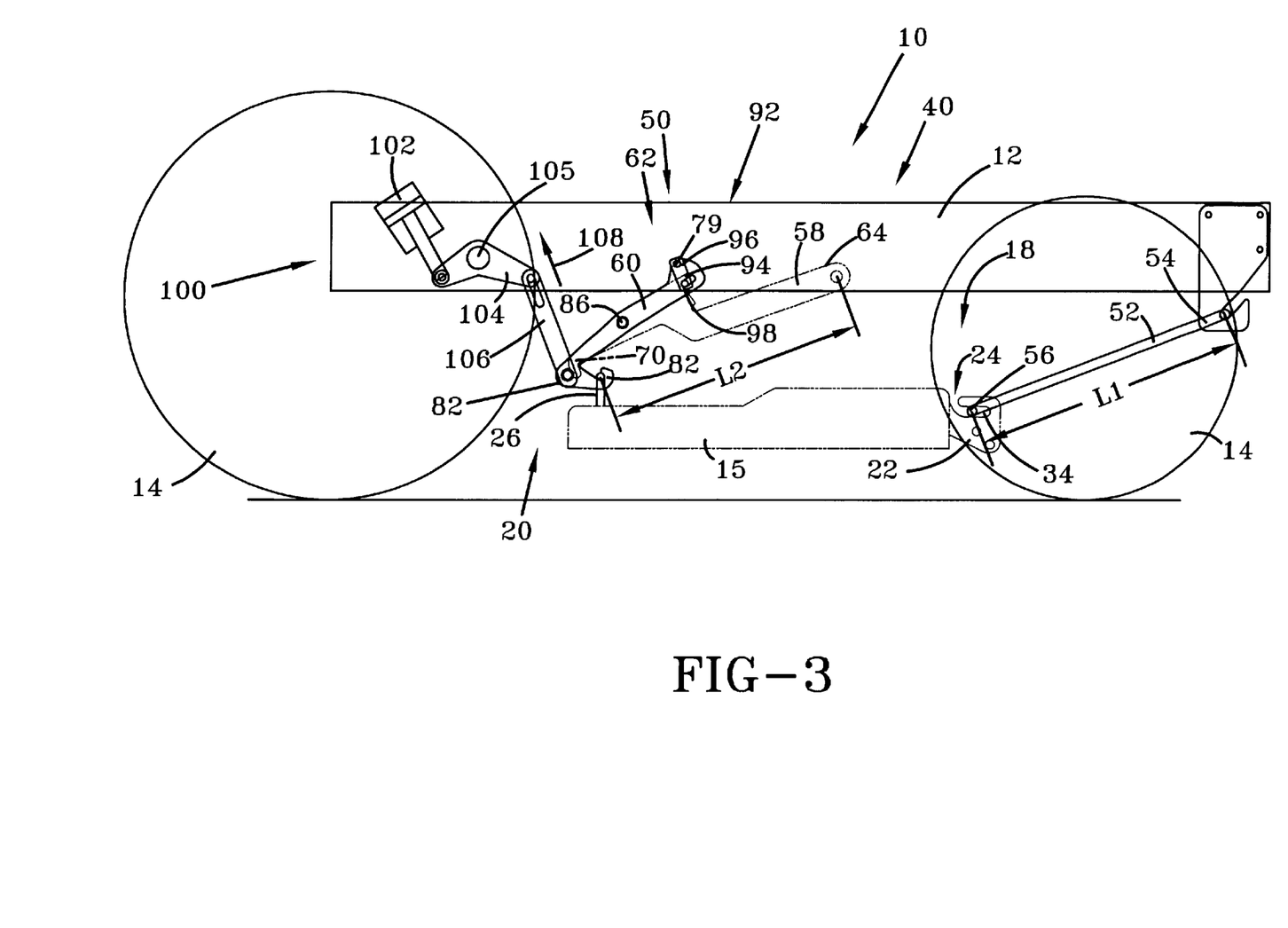
FIG. 3 is schematic representation showing the third link in a first position with respect to the second link thereby providing the split link with an effective length L2 that is less than the effective length L1 of the first link.
Figure 4:
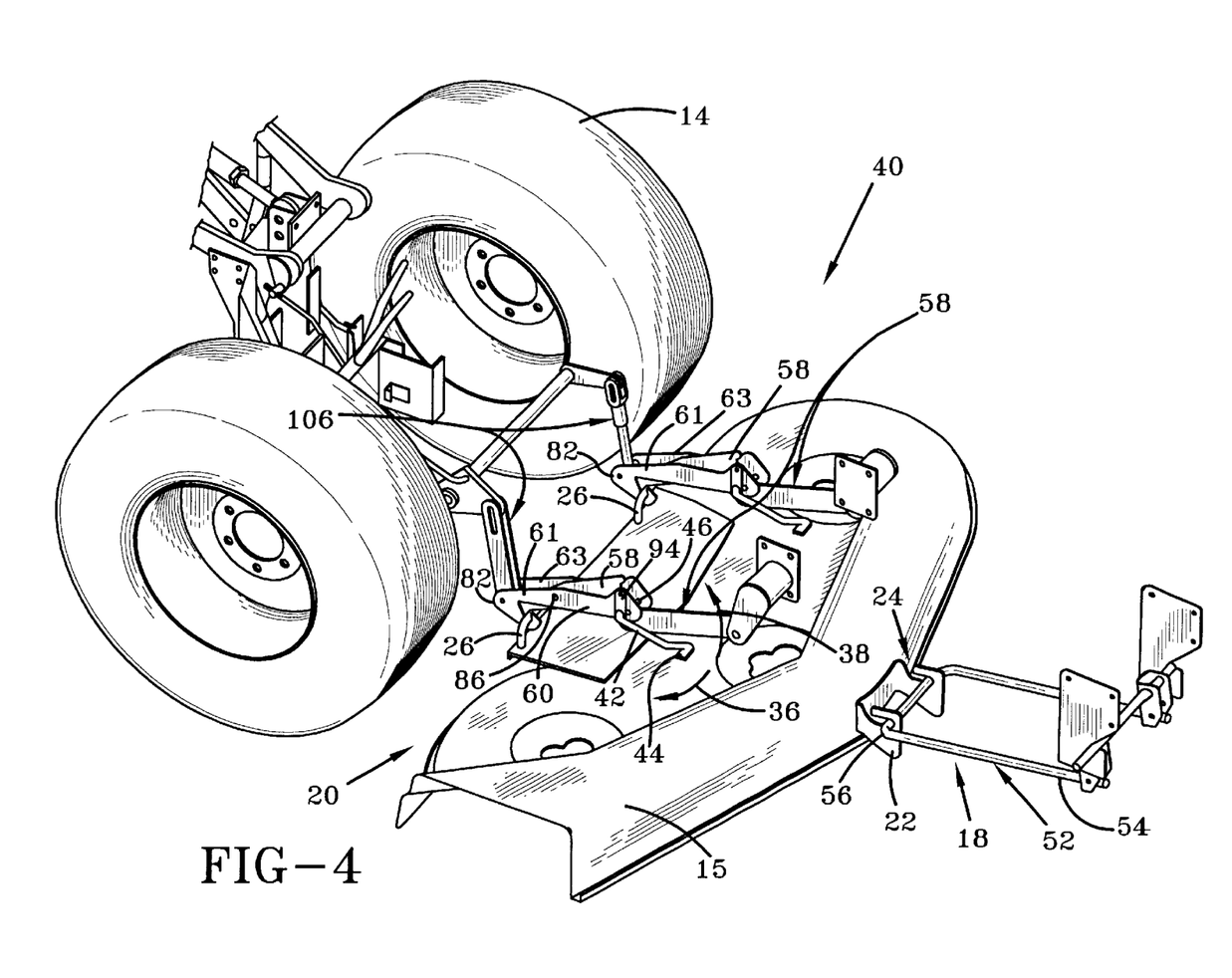
FIG. 4 is a partial perspective side view of the deck attachment and lift system without the tractor frame showing the directions into which the lock bracket may be pivoted and the first and second members that form the third link.
Figure 5:
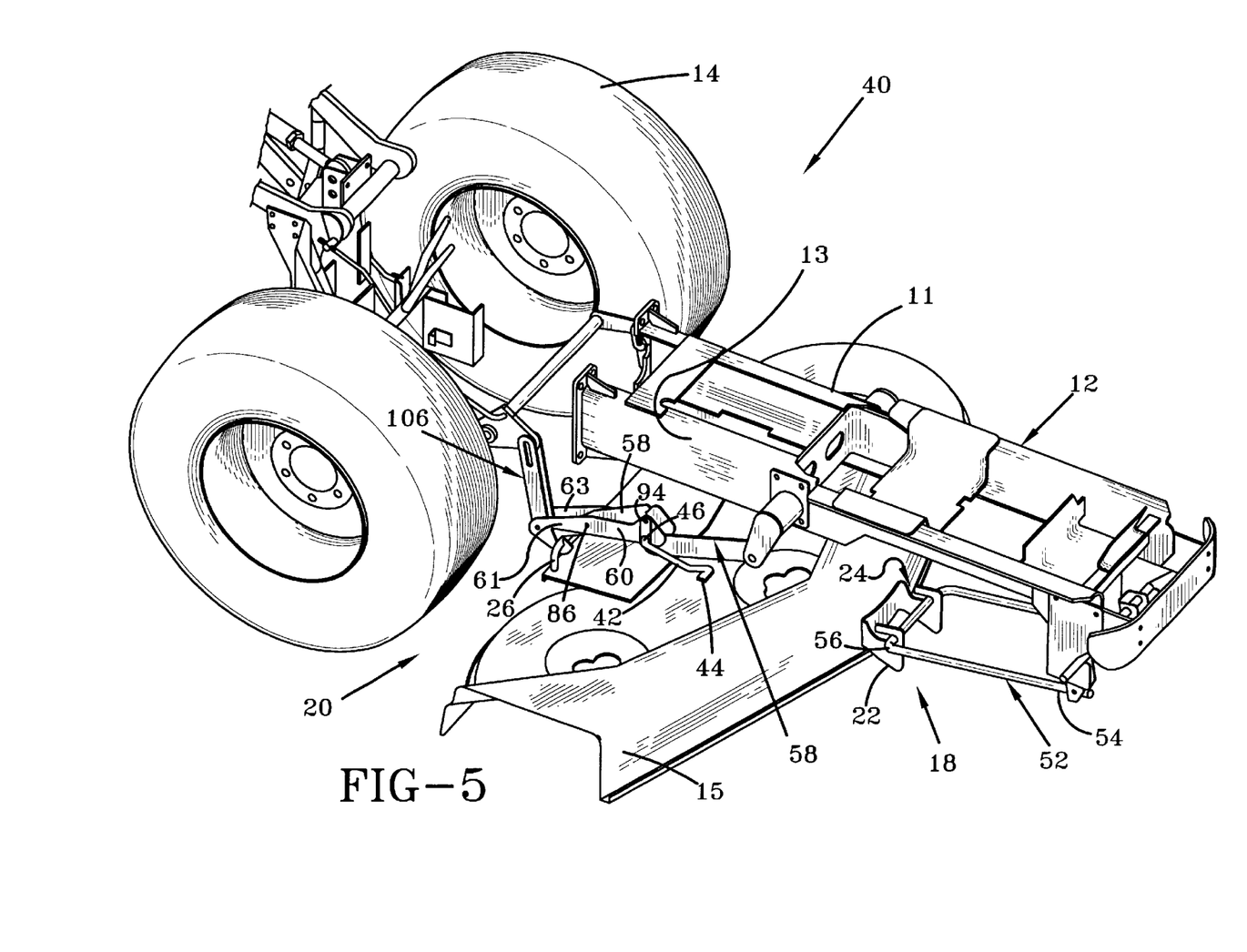
FIG. 5 is a partial perspective side view of the deck attachment and lift system with the tractor frame showing that the deck attachment mechanism forms a four-sided parallelogram on both sides of the frame.
Figure 6:
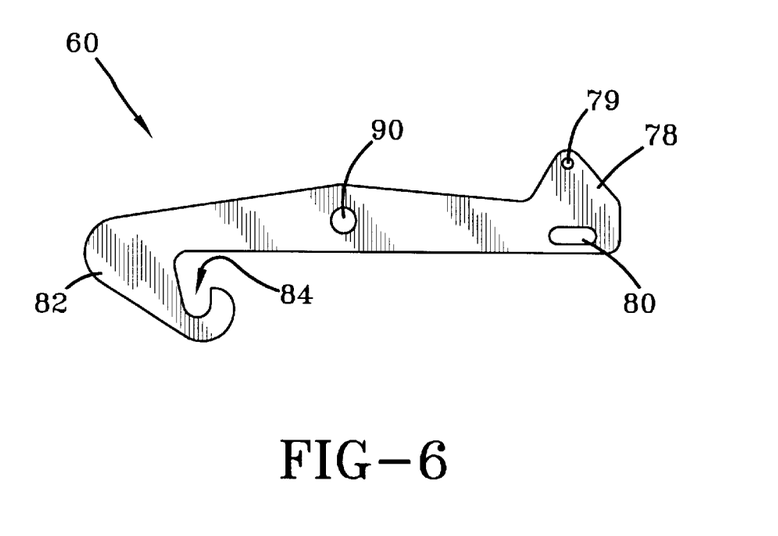
FIG. 6 is a side view of the third link showing the receiving area.

With reference now to FIGS. 2–6, the deck attachment mechanism 50 also includes a locking means 92 for use in selectively locking the third link 60 into the second position (shown in FIGS. 2 and 4). The locking means 92 includes a lock bracket 94 having first and second ends 96, 98 (FIG. 3). The first end 96 is pivotably connected to the first end 78 of the third link 60 about pivot point 79. The locking means 92 also includes a lock lever 42 (FIGS. 4–5) having a first end 44 adapted to be adjusted by an operator. The lock lever 42 has a second end 46 that extends through the lock bracket 94 and is received within the aperture 80 of the third link 60. The aperture 80 has a width (seen best in FIG. 6) significantly greater than the width (diameter) of the second end 46 of the lock lever 42 thereby providing room for the lock lever 42 to move within the aperture 80 as the lock bracket 94 is pivoted about pivot point 79. The lock bracket 94 may thus be pivoted in first and second directions 36, 38 (FIG. 4). Preferably, the lock lever 42 is fixedly connected to the lock bracket 94.

With reference now to FIGS. 4–7, although not necessary for this invention, preferably first and second members 61, 63 that are substantially similar in shape and size define the third link 60. This provides additional strength and stability. The second link 58 is positioned between the first and second members 61, 63 to provide a secure connection between the second end 66 of the split link 62 and the lift link 26. In particular, this arrangement provides one upward extending receiving area 84 (one for each member 61, 63) on each side of the downward extending receiving area 72 of the second link 58. Thus, the pivot rod 86 extends through both members 61, 63 permitting both members 61, 63 to pivot about the second link 58. Similarly, the second end 46 of the lock lever 42 is received within apertures 80 in both members 61, 63.

With reference now to FIGS. 2–3, the lift mechanism 100 is used to lift and lower (height adjust) the deck attachment mechanism 50 and thus the deck 15. The lift mechanism 100 is also used to position the third link 60 in the second position as will be discussed further below. The lift mechanism 100 includes lifting means 102 such as a hydraulic cylinder (shown) mounted to the frame 12. Other types of lifting means chosen with sound engineering judgment may also be used. Although the lifting means 102 may be directly connected to the deck attachment mechanism 50, preferably, the lifting means 102 is pivotably connected to one end of a lift bracket 104 that is pivotably connected to the frame about pivot point 105. The other side of the lift bracket 104 is connected to one end of a fourth link 106 that is connected at its other end to the second end 82 (FIG. 3) of the third link 60.

The operation of the deck attachment and lift system 40 will now be discussed. Referring to FIG. 3, to attach the deck 15 to the tractor 10, the deck 15 is first placed under the tractor 10. The first link 52 is then attached to the first attachment means 18 of the deck 15. Preferably this occurs when the second end 56 of the first link 52 is placed within the slots 24 in the attachment bracket 22. It should be noted that a tight fit is not required at this time. Thus, a gap 34 between the second end 56 of the first link and the most inward portion of the slots 24 is permissible. This makes the connection of the deck 15 to the first link 52 an easy operation for the operator. At this point, if the locking means 92 is in the locked position (shown in FIG. 2) it must be unlocked. The operator accomplishes this, referring to FIG. 4, by forcing the lock lever 42 in the second direction 38 thereby pivoting the lock bracket 94 about the pivot point 79. As the lock bracket 94 pivots, the second end 46 of the lock lever 42 moves out of the first slot 74 (FIG. 7) of the second link 58 thereby "unlocking" the locking means 92. The second end 46 of the lock lever 42 then slides along the cam surface 77 as the third link 60 pivots about the pivot rod 86. The second end 46 of the lock lever 42 continues to slide along the cam surface 77 until it is received within the second slot 76. At this point the third link 60 stops pivoting with the second end 82 of the third link 60 now positioned lower than the second end 70 of the second link 58. This is the position shown in FIG. 3. In this position, the split link 62 has an effective length of L2 (less than L1). Thus, it is now quite easy for the operator to attach the second end 82 of the third link 60 (and thus the second end 66 of the split link 62) to the lift link 26 as shown in FIG. 3.

Figure 7:
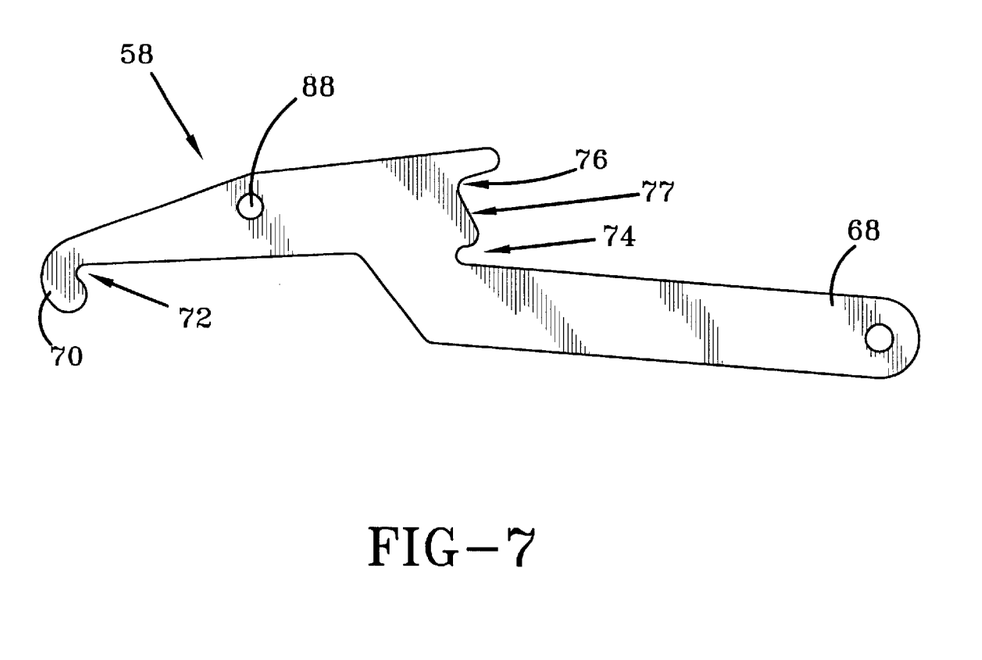
FIG. 7 is a side view of the second link showing the first and second slots and the cam surface.

The lifting means 102 is then operated such that the fourth link 106 is moved in upward direction 108 (shown in FIG. 3). This lifting is transferred to the third link 60 creating a force F1 (see FIG. 2) that is greater than the force F2 (the weight of the deck 15). This creates a torque or a moment that pivots the third link 60 about the pivot rod 86 and simultaneously moves the second end 46 of the lock lever 42 (FIG. 4) out of the second slot 76 of the second link 58 (FIG. 7). Continued lifting causes the third link 60 to continue to pivot and causes the second end 46 of the lock lever 42 to slide along the cam surface 77 into the first slot 74. At this point, the receiving area 72 of the second link 58 contacts the lift link 26 and the third link 60 is "locked" into the second position (FIG. 2). This locking of the third link 60 accomplishes two important functions. First, the third link 60 will no longer move relative to the second link 58 until it is unlocked as described above. Second, the split link 62 has an effective length of L1. The combination of these two functions means that continued adjustment of the lifting means 102 will evenly raise and lower the deck 15 because the parallelogram will remain intact.

With reference now to FIGS. 2–4, to detach the deck 15 from the tractor 10, the deck 15 is first lowered by the lifting means 102 to the ground. The operator then unlocks the locking means 92 as described above and detaches the second end 82 of the third link 60 from the lift link 26. Finally, the first link 52 is detached from the attachment bracket 22 and the deck 15 is removed.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. A mower comprising:

a frame;

a plurality of ground engaging wheels operatively connected to said frame;

a mower deck including at least a first cutting blade for use in cutting associated vegetation, said mower deck having first and second attachment means;

an engine mounted to said frame for use in rotating said at least first cutting blade;

a deck attachment mechanism for use in attaching said mower deck to said frame, said deck attachment mechanism forming a four sided parallelogram and including, A) a first side formed of a first link having a first end connected to said frame and a second end adapted to be connected to said first attachment means of said mower deck, said first link having an effective length L1;

B) a second side formed of second and third links forming a split linkage, said split linkage having a first end connected to said frame and a second end adapted to be connected to said second attachment means of said mower deck, said third link being selectively pivotable about said second link into first and second positions, said split linkage having an effective length L2 when said third link is positioned into said first position and an effective length L1 when said third link is positioned into said second position, said effective length L2 being less than effective length L1; and, C) locking means for selectively locking said third link into said second position; and, a deck lift mechanism for use in lifting said deck attachment mechanism and said mower deck, said deck lift mechanism including lifting means mounted to said frame and operatively connected to said third link, said lifting means for use in selectively positioning said third link into said second position as said mower deck is lifted.

2. The mower of claim 1 further comprising:

wherein said second link has a first end connected to said frame and a second end adapted to contact said second attachment means of said mower deck; and, wherein said third link has a first end and a second end adapted to be connected to said second attachment means of said mower deck, said third link being pivotably connected to said second link between said first and second ends of said third link.

3. The mower of claim 2 further comprising:
wherein said first end of said third link has an aperture;
wherein said second link has first and second slots positioned between said first and second ends of said second link;
wherein said locking means includes,
   A) a lock bracket having first and second ends, said first end of said lock bracket being pivotably connected to said first end of said third link; and,
   B) a lock lever operatively connected to said second end of said lock bracket, said lock lever having a first end adapted to be adjusted by an operator and a second end that extends through said lock bracket and into said aperture of said third link, said second end of said lock lever being received within said first slot of said second link when said third link is positioned in said first position, said second end of said lock lever being received within said second slot of said second link when said third link is positioned in said second position.

4. The mower of claim 1 wherein said third link has first and second members that are substantially similar, said second link being positioned between said first and second members of said third link.

5. The deck attachment and lift system of claim 1 wherein said deck attachment mechanism forms said four sided parallelogram on first and second sides of said frame.

6. A method of attaching a deck to a vehicle comprising the steps of:
   providing a vehicle with a frame and a plurality of ground engaging wheels operatively connected to said frame;
   providing a deck having first and second attachment means;
   providing said vehicle with a deck attachment mechanism having a first link with a first end connected to said frame and a second end adapted to be connected to said first attachment means of said deck, said first link having an effective length L1, said deck attachment mechanism also including a split linkage formed of second and third links, said split linkage having a first end connected to said frame and a second end adapted to be connected to said second attachment means of said deck, said third link being selectively pivotable about said second link into first and second positions, said split linkage having an effective length L2 when said third link is positioned into said first position, said effective length L2 being less than effective length L1; and,
   providing said vehicle with a deck lift mechanism including lifting means mounted to said frame and operatively connected to said third link;
   placing said deck under said vehicle;
   attaching said first link to said first attachment means of said deck;
   attaching said split link to said second attachment means of said deck;
   lifting said attachment mechanism and thereby said deck; and,
   positioning said third link into said second position thereby providing said split link with an effective length L1.

7. The method of claim 6 further comprising the steps of:
   providing said deck attachment mechanism with locking means; and,
   wherein after the step of positioning said third link into said second position thereby providing said split link with an effective length L1, the method comprises the step of locking said third link into said second position.

8. The method of claim 7 further comprising the steps of:
   providing said second link with first and second slots;
   providing said third link with a first end having an aperture;
   providing said locking means with a lock bracket having a first end pivotably connected to said first end of said third link, also providing said locking means with a lock lever operatively connected to a second end of said lock bracket, said lock lever having a first end adapted to be adjusted by an operator and a second end that extends through said lock bracket and into said aperture of said third link; and,
   wherein the step of locking said third link into said second position comprises the step of positioning said second end of said lock lever within said second slot of said second link.

9. The method of claim 8 wherein prior to the step of attaching said split link to said second attachment means of said deck, the method comprises the step of:
   positioning said second end of said lock lever within said second slot of said second link thereby unlocking said locking means and permitting said third link to pivot about said second link and providing said split link with an effective length of L2.

10. The method of claim 6 further comprising the steps of:
   providing said third link with first and second ends, said second end of said third link being adapted to be connected to said second attachment means of said deck; and,
   wherein the step of attaching said split link to said second attachment means of said deck comprises the step of attaching said second end of said third link to said second attachment means of said deck.

11. The method of claim 10 further comprising the steps of:
   providing said second link with a first end that is connected to said frame and a second end adapted to contact said second attachment means of said deck; and,
   wherein the step of positioning said third link into said second position thereby providing said split link with an effective length L1 comprises the step of contacting said second attachment means of said deck to said second end of said second link.

12. A deck attachment and lift system comprising:
   a deck attachment mechanism for use in attaching to an associated frame and an associated deck, said deck attachment mechanism forming a four sided parallelogram and including,
   A) a first side formed of a first link having a first end adapted to be connected to the associated frame and a second end adapted to be connected to the associated deck, said first link having an effective length L1;
   B) a second side formed of second and third links forming a split linkage, said split linkage having a first end adapted to be connected to the associated frame and a second end adapted to be connected to the associated deck, said third link being selectively pivotable about said second link into first and second positions, said split linkage having an effective length L2 when said third link is positioned into said first position and an effective length L1 when said third link is positioned into said second position, said effective length L2 being less than effective length L1; and, C) locking means for selectively locking said third link into said second position; and, a deck lift mechanism for use in lifting said deck attachment mechanism and the associated deck, said deck lift mechanism including lifting means adapted to be mounted to the associated frame and operatively connected to said third link, said lifting means for use in selectively positioning said third link into said second position as the associated deck is lifted.

13. The deck attachment and lift system of claim 12 further comprising:

wherein said second link has a first end adapted to be connected to the associated frame and a second end adapted to contact the associated deck; and, wherein said third link has a first end and a second end adapted to be connected to the associated deck, said third link being pivotably connected to said second link between said first and second ends of said third link.

14. The deck attachment and lift system of claim 13 further comprising:

wherein said first end of said third link has an aperture;

wherein said second link has first and second slots positioned between said first and second ends of said second link;

wherein said locking means includes,

A) a lock bracket having first and second ends, said first end of said lock bracket being pivotably connected to said first end of said third link; and, B) a lock lever operatively connected to said second end of said lock bracket, said lock lever having a first end adapted to be adjusted by an operator and a second end that extends through said lock bracket and into said aperture of said third link, said second end of said lock lever being received within said first slot of said second link when said third link is positioned in said first position, said second end of said lock lever being received within said second slot of said second link when said third link is positioned in said second position.

15. The deck attachment and lift system of claim 12 wherein said third link has first and second members that are substantially similar, said second link being positioned between said first and second members of said third link.

* * * * *